US005459931A

United States Patent [19]
Waltho

[11] Patent Number: 5,459,931
[45] Date of Patent: Oct. 24, 1995

[54] DIRECTION INDICATOR

[76] Inventor: Barry S. Waltho, 14 Primrose Cottages, Bowdon Vale, Altrincham, Cheshire WA14 3EL, United Kingdom

[21] Appl. No.: 204,309
[22] PCT Filed: Sep. 10, 1992
[86] PCT No.: PCT/GB92/01658
 § 371 Date: Apr. 27, 1994
 § 102(e) Date: Apr. 27, 1994
[87] PCT Pub. No.: WO93/05362
 PCT Pub. Date: Mar. 18, 1993

[30] Foreign Application Priority Data

Sep. 11, 1991 [GB] United Kingdom ............... 9119422

[51] Int. Cl.⁶ ................................................ G01C 17/34
[52] U.S. Cl. ................................................ 33/271; 33/270
[58] Field of Search .......................... 33/268, 269, 270, 33/271, 355 R, 364

[56] References Cited

U.S. PATENT DOCUMENTS

| 1,270,505 | 6/1918 | Fields | 33/268 |
| 3,243,881 | 4/1966 | Brink | 33/271 |
| 4,899,451 | 2/1990 | Dandurand | 33/269 |

FOREIGN PATENT DOCUMENTS

| 2635181 | 2/1990 | France. | |
| 1934 | of 1880 | United Kingdom | 33/268 |
| 11797 | of 1897 | United Kingdom | 33/268 |
| 2191579 | 12/1987 | United Kingdom. | |

Primary Examiner—William A. Cuchlinski, Jr.
Assistant Examiner—G. Bradley Bennett
Attorney, Agent, or Firm—Pravel, Hewitt, Kimball & Krieger

[57] ABSTRACT

A direction indicator includes a base defining four edges that extend parallel to a horizontal surface on which the base is placed and form portions of respective sides of a rectangle, a bearing indicator which is selectively positionable on the base for carrying compass bearing information, and a gnomon supported in a predetermined position relative to the direction indicator. The bearing indicator may further contain time markings in the event that it is used as a sundial. The base is adapted to be placed in a predetermined orientation on a horizontal surface. For a given orientation of the base, the direction indicator can be appropriately positioned relative to the base by reference to the direction of a shadow cast by the gnomon at a predetermined time of day and by reference to the bearing of the sun at that predetermined time of day.

10 Claims, 8 Drawing Sheets

DIRECTION INDICATOR

BACKGROUND OF THE INVENTION

The present invention relates to a direction indicator of a type for providing compass bearings.

Devices for indicating compass directions are well known in the art. The most widely used of such devices is the magnetic compass. The magnetic compass essentially comprises a magnetic indicator needle mounted to rotate about a vertical axis on a body which has compass directions marked thereon. The indicator needle is mounted in such a way that there is minimal resistance to its rotational movement with respect to the body so that whatever the horizontal orientation of the body the needle will align itself with magnetic North. The compass direction markings on the body may then be aligned so that the marking for North is aligned with the needle pointing towards magnetic North. This may be achieved by rotating the compass body itself or by providing direction markings on a structure itself rotatably mounted on the compass body. Any desired compass bearing can then be obtained from the direction markings. Such devices are effective but tend to be relatively expensive to manufacture if they are to be both robust and accurate, and in any event can only indicate the direction of magnetic North rather than true North.

Alternative methods of determining compass bearings are known which use the bearing of the sun at a known time as a reference. For example a normal analogue watch may be used. This very crude method is based on the fact that when the sun is at its highest point it will be either due North or due South of the observer, depending on the observers location. On a given meridian, this corresponds to 12.00 in the Winter and 13.00 in British Summer time. Thus if the observer is located in the Northern hemisphere the sun will be due South at noon and if the observer is located in the Southern hemisphere the sun will be due North at noon. The method also depends on the fact at any given time the position of the sun is crudely related to the time of day and therefore to the position of the watches hour hand. The exact method used is to first determine the point midway between the point indicated by the hour hand and the position of the midday hour marking. An imaginary line drawn from the centre of the watch face to this midway point is then pointed at the sun. The direction then indicated by a line drawn from the centre of the watch face to the midday hour marking will be roughly North/South (depending on which hemisphere the observer is located in). All other compass bearings can be determined using this as the reference. It will be appreciated that this method is relatively difficult to perform and cannot be used to obtain accurate bearings. Furthermore, this method has the disadvantage that the observer must always have a clear line of sight to the sun whenever a bearing is to be taken.

SUMMARY OF THE INVENTION

It is an object of the present invention to provide a direction indicator which is easy to manufacture and to use.

According to the present invention there is provided a direction indicator comprising a base adapted to be placed in a predetermined orientation on a horizontal surface, the base defining four edges that extend parallel to a horizontal surface on which the base is placed and form at least portions of respective sides of a rectangle, a bearing indicator which is selectively positionable on the base, the bearing indicator carrying compass bearing information, and a gnomon supported in a predetermined position relative to the direction indicator, whereby for a given orientation of the base the direction indicator can be appropriately positioned relative to the base by reference to the direction of a shadow cast by the gnomon at a predetermined time of day and by reference to the bearing of the sun at that predetermined time of day.

Preferably the bearing indicator is a suitably marked circular member rotatably mounted horizontally on the base. For example the bearing indicator may be a disc that mounts in a circular indent in the base, or a flat ring that mounts in an annular indent defined by the base.

Preferably the bearing indicator is a snap fit with the base. For example, the circumferential edge or edges of the indent may be slightly undercut and the base and/or bearing indicator may be constructed from a resilient material. Thus once the bearing indicator is snapped into place, it will not be accidentally displaced.

The gnomon may be in the form of a fin disposed on a diameter of the bearing indicator. The fin may define a straight, horizontal top edge which has a groove running along its length. The fin may have laterally projecting abutments which extend vertically from the base to a height not more than the vertical height of the gnomon. Alternatively the gnomon may be a pin which mounts in a suitably provided hole so that it extends vertically. The gnomon may be formed integrally with the bearing indicator, but will generally be a snap or push fit therewith. Alternatively, the gnomon mounts on the base so as to be rotatable both with respect to the base and the bearing indicator.

In one embodiment of the invention in which the bearing indicator is annular, the gnomon may be mounted on a circular disc which is itself mounted on the base within the annular bearing indicator so as to be rotatable with respect to the base and the bearing indicator.

In another embodiment of the invention in which the bearing indicator is a circular disc, the gnomon is in the form of a pin which may be supported in a sighting device rotatably supported by the circular disc which in turn is rotatably received by the base.

In embodiments in which the gnomon is a pin, two holes may be provided for mounting the gnomon, one adjacent the periphery of the bearing indicator and one at its centre. The bearing indicator may then have appropriate hour markings in addition to compass bearing markings so that it can function with suitable modifications as a dual direction indicator/sundial. Alternatively, a single central hole may be provided to receive the pin gnomon, the base being provided with supports to enable it to be supported at an angle to a supporting window ledge when in use as a sundial.

Given that the base has four sides which define edges of a rectangle, one of those sides can be placed against a window or window frame in a Southerly facing elevation of a house. The bearing indicator can then be appropriately positioned by reference to the direction of the sun, for example at noon when the sun will be in a substantially Southerly direction. The indicator device can then be moved to any other room on that Southerly elevation of the building and the setting of the bearing indicator will still be appropriate. Furthermore, assuming that as is generally the case the building itself is rectangular, the indicator device can be moved to windows in the other three sides of the same building and the bearing indicator will remain in the correct orientation providing the base is maintained in the same orientation relative to the geometry of the building. The setting of the bearing indicator can thus be valid even in a North-facing window. Therefore once the bearing indicator has been set in the appropriate position the indicator device can be used to determine the bearing of objects in substantially any direction from the building.

Embodiments of the present invention will now be described, by way of example, with reference to the accompanying drawings, in which

DESCRIPTION OF THE PREFERRED EMBODIMENTS

Figures 1, 2:
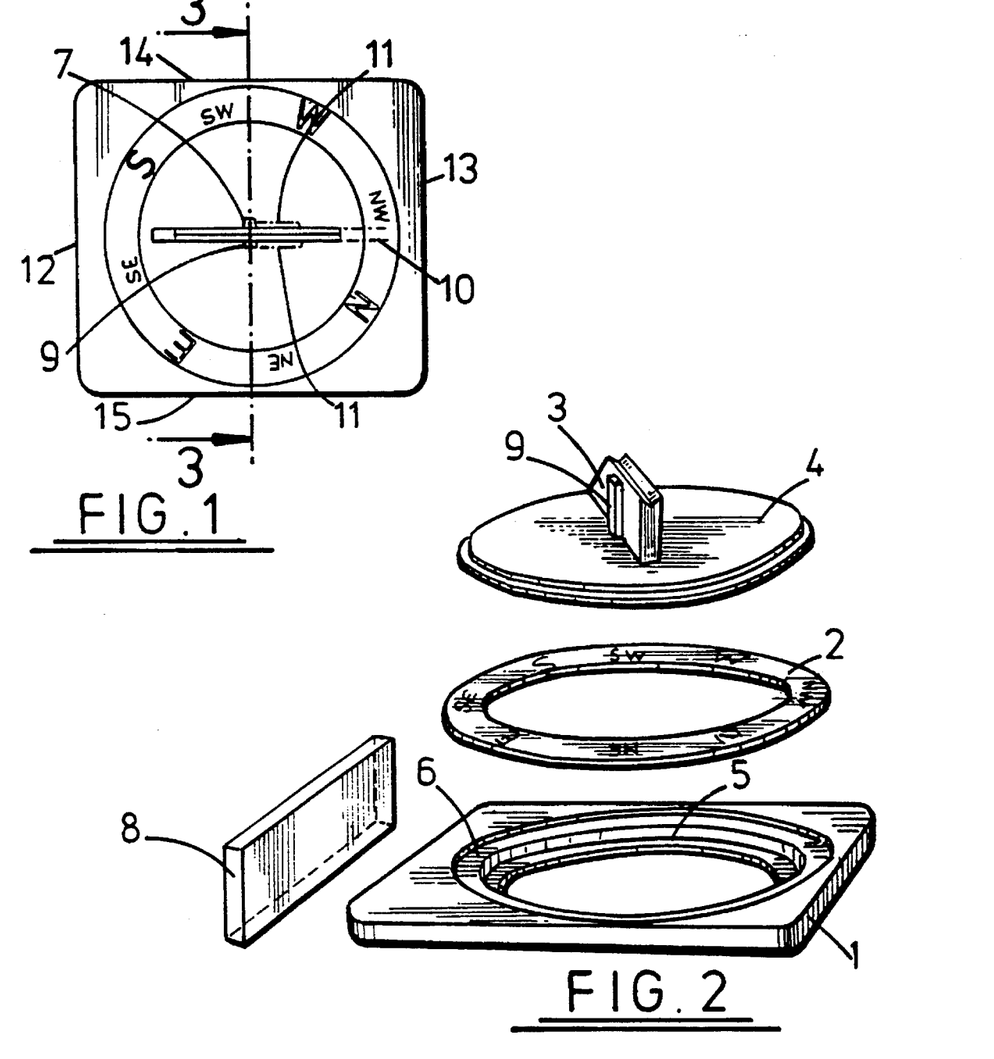
FIG. 1 is a plan view of a first embodiment of the invention.
FIG. 2 is an exploded view of component parts making up the embodiment of FIG. 1.
Figure 3:
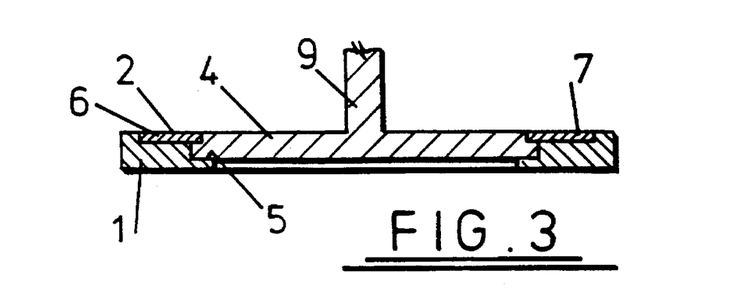
FIG. 3 is a section through the embodiment of FIG. 1 along section line labelled 3—3.

Referring to FIGS. 1 to 3, the illustrated indicator device comprises a base 1, a bearing indicator 2 and a gnomon 3 which is mounted on a support disc 4. The base 1 defines a circular aperture around the lower edge of which a flange extends radially so as to define an upwardly facing surface 5. The disc 4 rests on surface 5. The upper edge of the aperture and the base 1 is cut away to define an upwardly facing surface 6 extending radially from an undercut peripheral edge 7. The bearing indicator 2 can be snapped into the base so that its peripheral edge which is chamfered engages in the undercut 7. In this position which is illustrated in FIG. 3 the bearing indicator 2 rests on a surface 6 but cannot be rotated relative to the surface 6 as it is a tight fit. When the device is assembled it can be seen from FIG. 3 that the peripheral flange on the disc 4 is engaged between the surface 5 and the bearing indicator 2. Thus the three components of the device are retained together.

It can be noted from FIG. 1 that one side of the base is wider than the others, ie further from the centre of the circular aperture. Generally this side of the base will carry written material for example an indication that this side is to be placed adjacent the window during setting up. In use the base is placed on the window ledge of the Southerly window such that the wider side of the base abuts the window pane or window frame. The relative orientation of the base 1 relative to a section of the window 8 is indicated in FIG. 2.

Thus once the base is in position its orientation relative to the window and therefore to the building of which the window forms a part is established. The disc 4 is then placed in the base so as to be rotatable thereto and the bearing indicator 2 is loosely located around the disc 4 and above the surface 6. At a predetermined time of day when the sun has a known orientation, for example at noon when the sun will be substantially due South, the gnomon 3 is aligned with the direction of the sun such that the shadow cast by the gnomon is aligned with the length of the gnomon. Shoulders 9 provided on the gnomon assist in orienting the device. As shown in FIG. 1 the gnomon will cast a shadow indicated by broken lines 10 and the shoulders 9 will cast shadows indicated by broken lines 11. By ensuring that the shadows 11 are symmetrical relative to the gnomon the user can readily determine when the gnomon is aligned with the direction of the sun.

When the gnomon is aligned with the direction of the sun, the shadow 10 will indicate due North assuming that the sun is due South. The bearing indicator 2 can then be rotated until the indication of due North corresponds to the position of the shadow 10. A fine cursor line, for instance in the form of a narrow groove, may extend from the left hand end of the gnomon as shown in FIG. 1, to facilitate accurate alignment of the gnomon with the South direction marking. The bearing indicator can then be pressed down against the surface 6 so that its edge snaps into the undercut 7 in the base 1. The device is then set up and can be subsequently used.

Still referring to FIG. 1, whenever the edge 12 is parallel to the window used for setting the position of the bearing indicated 2, the bearing indicator will correctly give the appropriate compass bearings of any point towards which the gnomon is directed. Assuming that the window against which the base edge 12 was placed to set the position bearing indicator 2 is part of a building which is rectangular in plan, the indicator device shown in FIG. 1 could be moved to the opposite side of the building and the edge 13 placed against the window on that side of the building. If this is done the bearings indicated by the bearing indicator 2 remain valid. The same is the case if sides 14 and 15 are placed parallel to the corresponding sides of the building. Thus once the Southerly window has been used to set the position of the bearing indicator 2, the device can be used to determine the bearings from any window of a rectangular building, including windows on different floors of the building.

Figure 4:
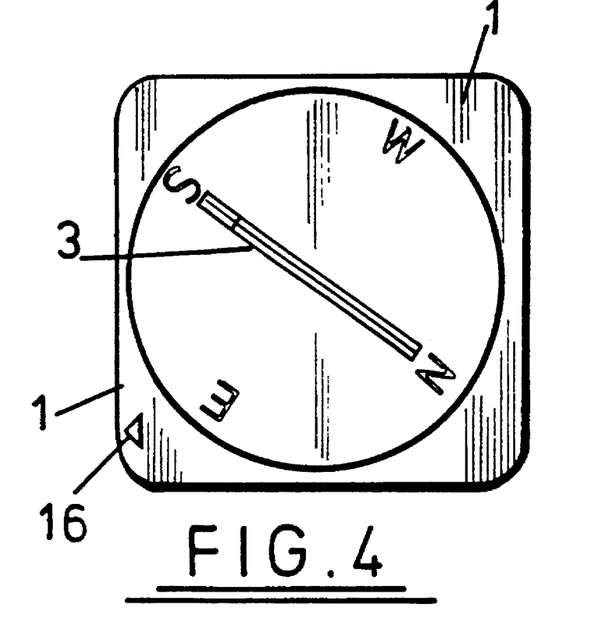
FIG. 4 is a plan view of a two-part embodiment of the present invention.
Figure 5:
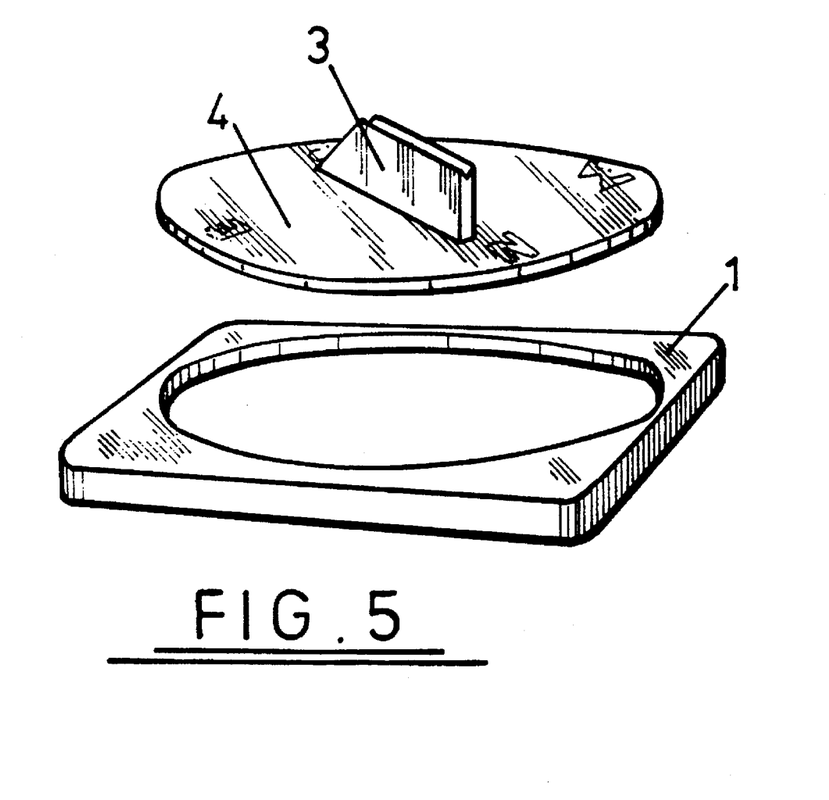
FIG. 5 is an exploded view of the components making up FIG. 4.

In the embodiments of FIGS. 1 to 3, the gnomon 3 is rotatable relative to the base 1 and relative to the bearing indicator 2 so that it can be used to "point" towards an object of interest, for example a building in the distance. Once so pointed the bearing can be read off the bearing indicator 2 by reference to the position of the tapered end of the gnomom 3, or cursor line where provided. It would be possible however to produce an embodiment of the invention in which the gnomon 3 and bearing indicator 2 are integral to define a one part component as illustrated in FIGS. 4 and 5. The same reference numerals are used for equivalent components in FIGS. 4 and 5 as were used in the description of FIGS. 1 to 3. The only disadvantage with the arrangement of FIGS. 4 and 5 is that the gnomon 3 is fixed in position relative to the bearing indicator and cannot therefore be used to "point" towards objects of interest. The general validity of the positioning of the bearing indicator is however maintained just as in the case of the embodiments of FIGS. 1 to 3. As shown in FIG. 4 an indicator arrow 16 may be incorporated in the base 1 to identify the "reference" edge of the base which is used for initial setting of the orientation of the combined gnomon and bearing indicator. In the embodiment of FIGS. 4 and 5, the disc 4 is a simple direct snap fit into an undercut rim defining the periphery of a circular recess defined in the base 1.

Figure 6:
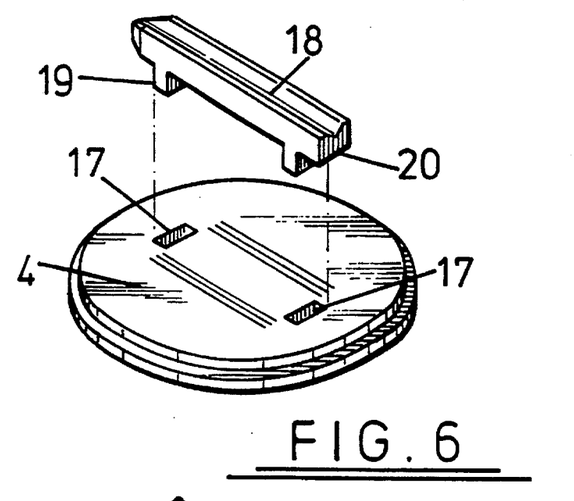
FIGS. 6, 7 and 8 illustrate an alternative structure for incorporation in components also incorporated in the embodiment of FIGS. 1 to 3.
Figure 7:
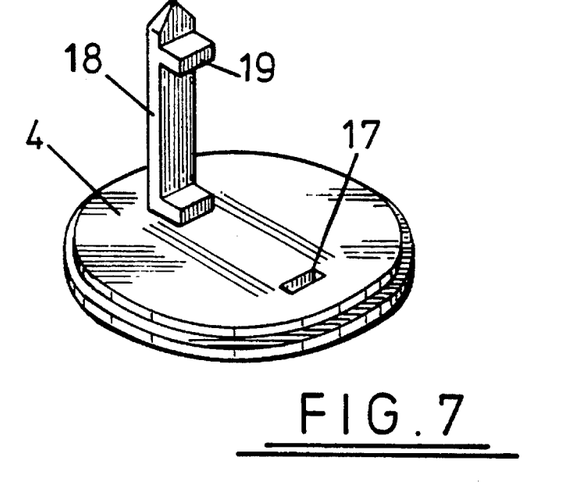
Figure 8:
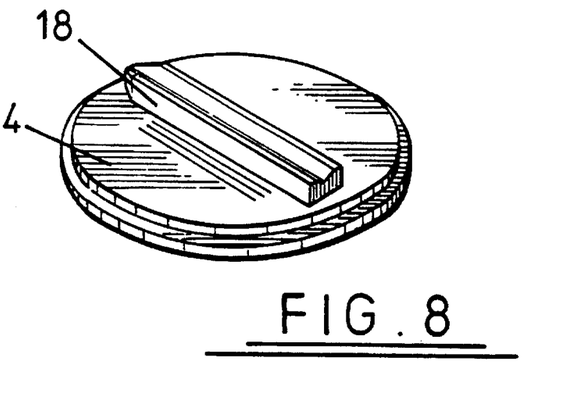

Referring now to FIGS. 6, 7 and 8, this shows an alternative disc arrangement intended for substitution in place of the disc 4 and gnomon 3 of the embodiment of FIGS. 1 to 3. In the arrangement of FIGS. 6 to 8, the disc 4 does not support an upstanding gnomon but rather is provided with two recesses 17. The gnomon is in the form a member 18 defining support legs 19 and an overhanging end portion 20. When the device is to be used for casting a shadow the member 18 is positioned as shown in FIG. 7 with the end portion 20 received in one of the apertures 17. This enables the bearing indicator 2 of FIG. 1 to be appropriately located in the base 1. Thereafter, the member 18 is repositioned with the two members 19 received in the apertures 17 as shown in FIG. 8. The member 18 which has a groove on its upper surface can then be used for "pointing" towards an object of interest.

Figure 9:
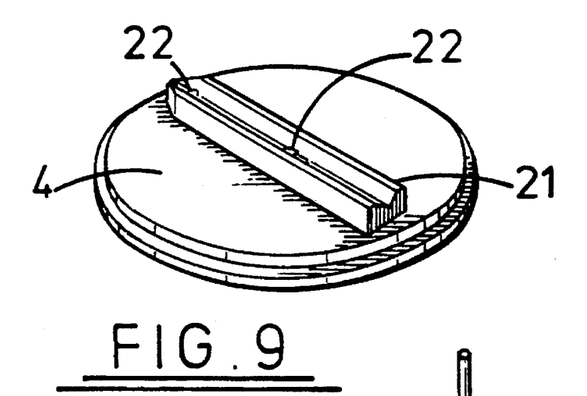
FIGS. 9, 10 and 11 illustrate a further alternative arrangement for incorporation with components incorporated in the embodiments of FIGS. 1 to 3.
Figure 10:
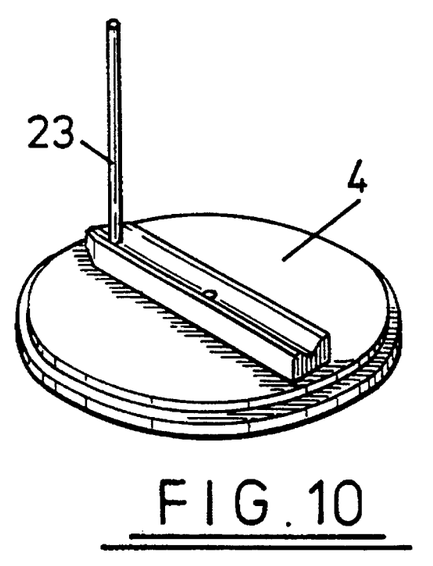
Figure 11:
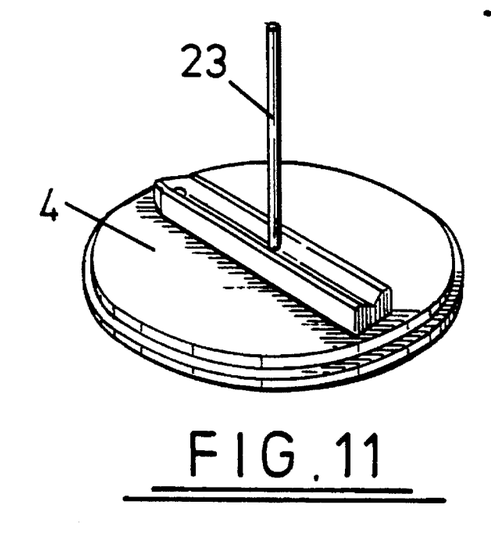

Referring now to FIGS. 9, 10 and 11, these again show an alternative structure to the combined disc 4 and gnomon 3 of the embodiment of 1 to 3. The disc 4 supports an integrally moulded pointing member 21 in which two holes 22 are provided, one hole being adjacent the periphery of the disc 4 and the other being located to coincide with the centre of rotation of the disc 4. A rod which may normally be stored beneath the disc in an appropriate snap fit recess may be positioned in either of the holes 22. During the process of setting the position of the bearing indicator, the rod 23 is placed in the hole adjacent the periphery of the disc 4. The rod can then be used to cast a shadow so that the bearing indicator can be appropriately located. Thereafter the rod 23 may simply be removed or may be placed in the centrally located hole 22 as shown in FIG. 11. In this orientation the rod 23 constitutes a gnomon to cast a shadow on a sundial which could be incorporated in the bearing indicator 2.

Figure 12:
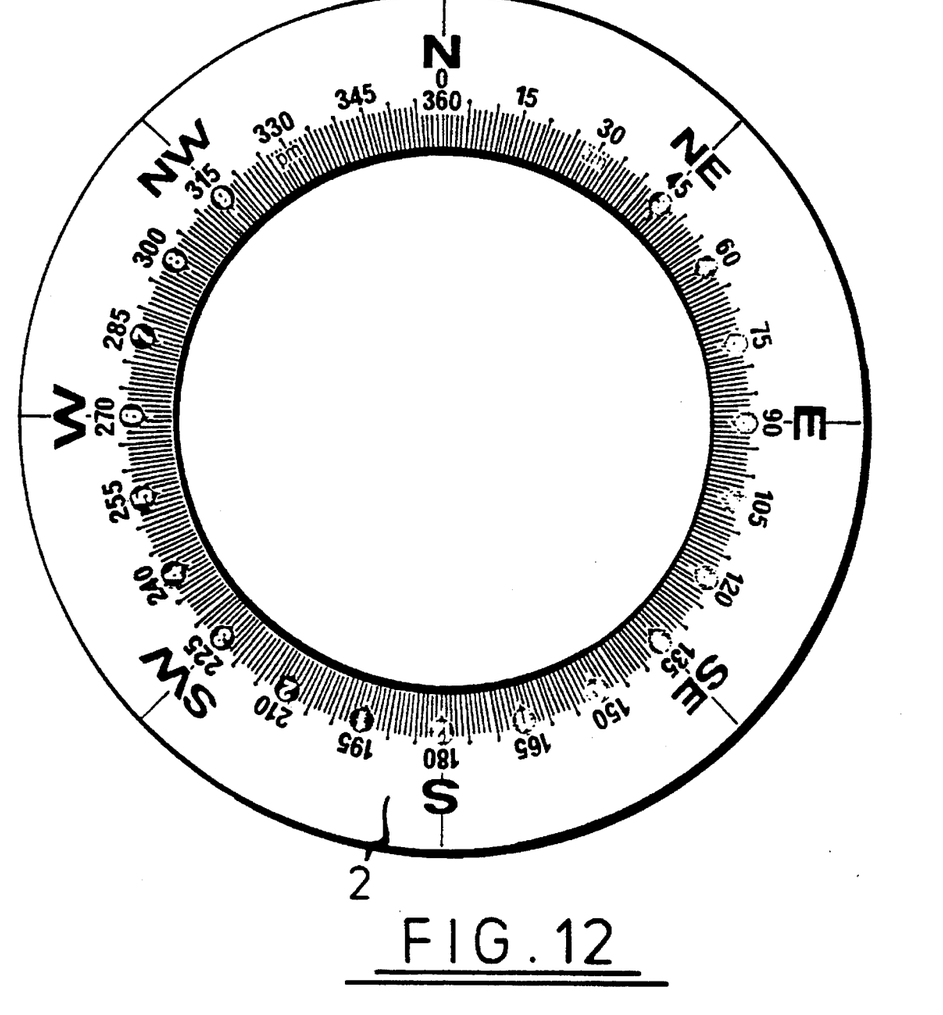
FIG. 12 illustrates a component of a modification of the embodiment of FIG. 1.
Figure 13:
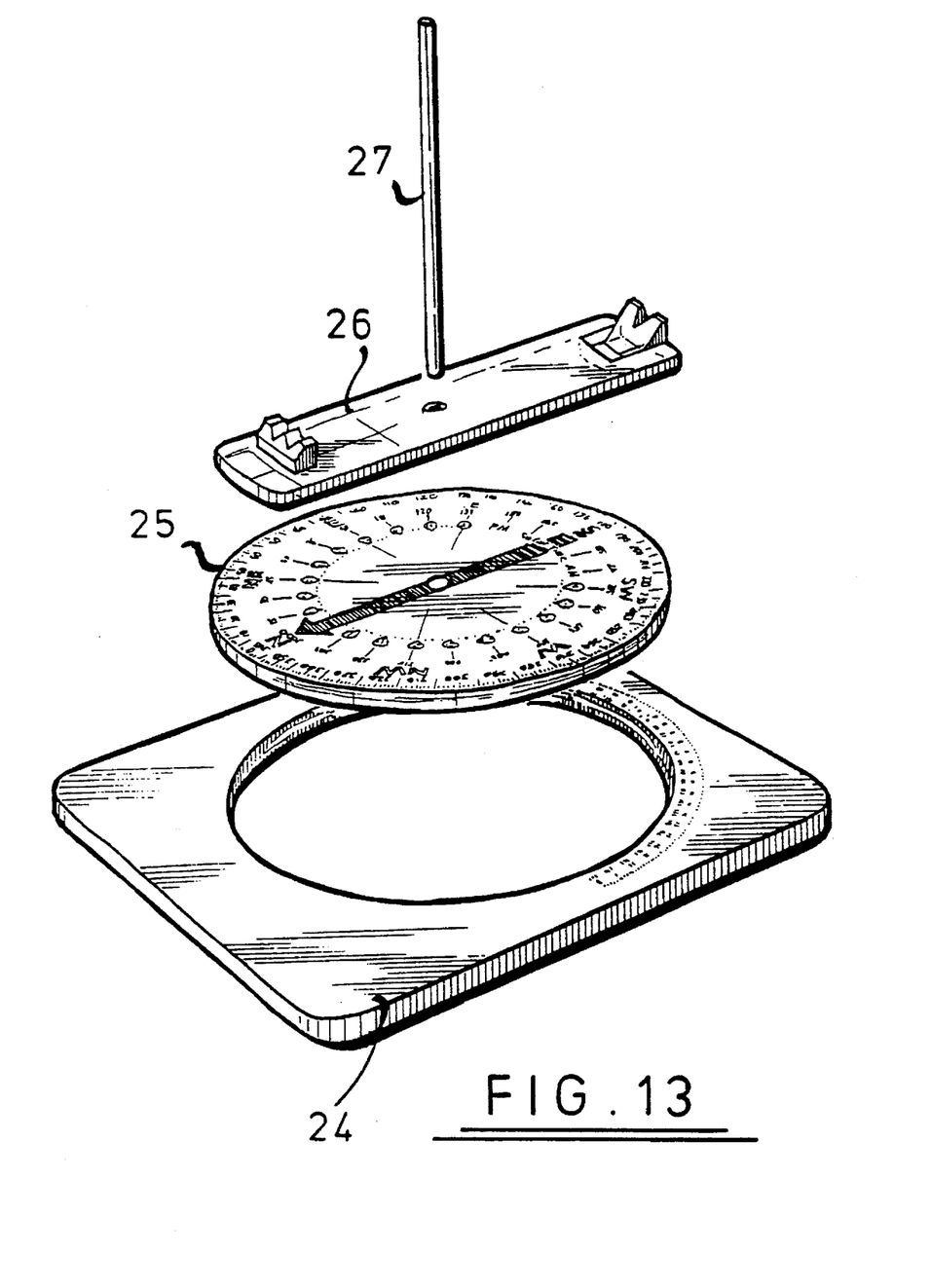
FIG. 13 is an exploded view of a further embodiment of the present invention.

FIG. 12 illustrates an example of a suitably marked bearing indicator 2 which may also function as a sundial as described. Thus providing the indicator was located on a Southerly window it could be used to tell the time as well as to enable the compass bearings of objects of interest to be determined.

Figures 14, 15:
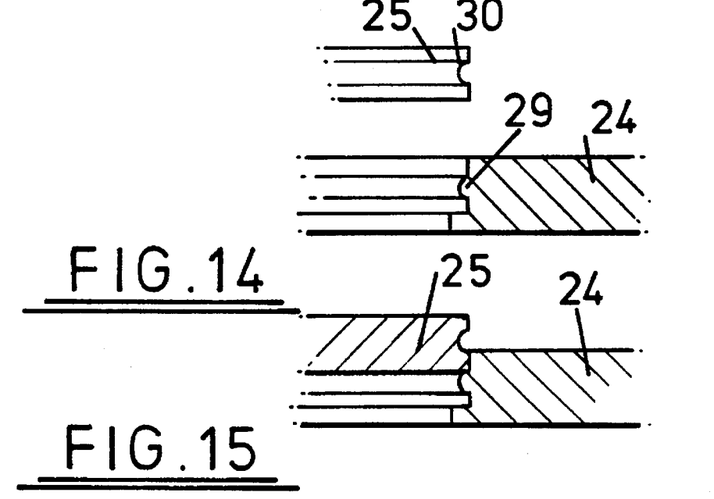
FIGS. 14 to 19 illustrate details of the embodiment of FIG. 13.
Figure 16:
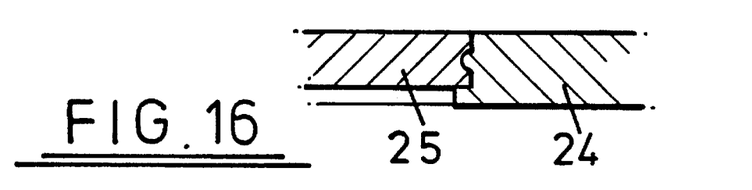

Referring now to FIGS. 13 to 20, an alternative embodiment of the invention will be described. This embodiment incorporates four main components, that is a base 24, a circular bearing indicator disc 25, a sighting device 26 and a pin gnomon 27. As shown in FIGS. 14 to 16, the base 24 defines a lower lip 28 and an annular projection 29 intended to mate with an annular recess 30 in the disc 25. FIG. 14 shows the base and disc separated, FIG. 15 shows the disc 25 resting on the projection 29, in which position the disc can be readily rotated relative to the base to a desired position, and FIG. 16 shows the disc 25 pushed into full engagement with the base as a result of which the formations 29 and 30 interengage. The disc and base are then held together securely and will not rotate one relative to the other. The disc can be removed from the base by forcing the disc edge over the projection 29.

Figure 17:
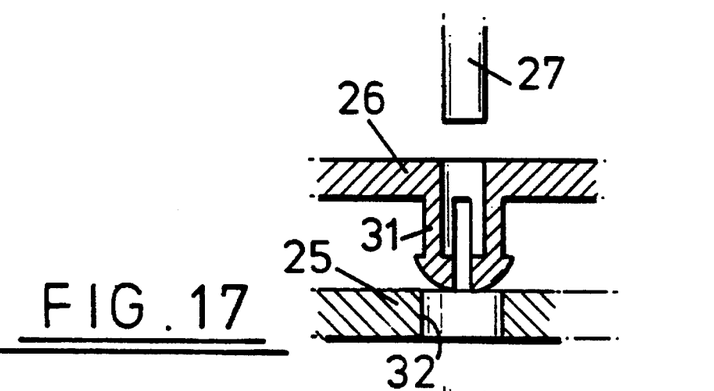
Figure 18:
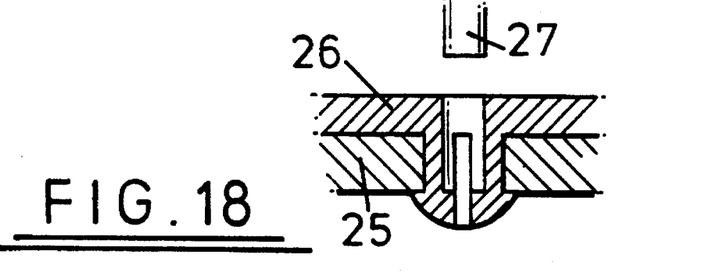

FIGS. 17 and 18 illustrate the interengagement between the disc 25, the sighting device 26 and the pin 27. The sighting device 26 supports a downwardly extending axially split tube 31 which is intended to engage in an aperture 32 in the disc 25. The tip of the tube 31 is enlarged so that as the tube 31 is pushed into the aperture 32 it is initially radially deformed and then springs outwards to engage the underside of the disc 25 as shown in FIG. 18.

The use of the components illustrated in FIGS. 13 to 18 corresponds to the use of the previously described embodiments in that the pin 27 is used to cast a shadow on the disc 25 which is then appropriately positioned so that the bearing indications on the disc 25 correspond with the orientation of the device as determined by the positioning of the base 24. It will be seen that the disc 25 carries conventional bearing markings and our markings and that the base carries a scale to enable the application of simple triangulation techniques such as range finding and assessing the angle subtended between two objects sighted using the sighting device 26.

Figure 19:
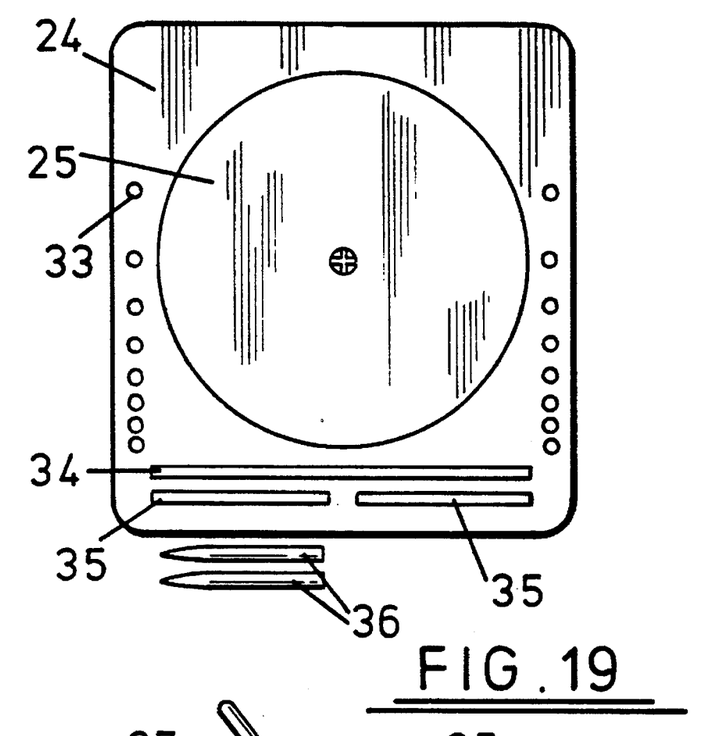
Figure 20:
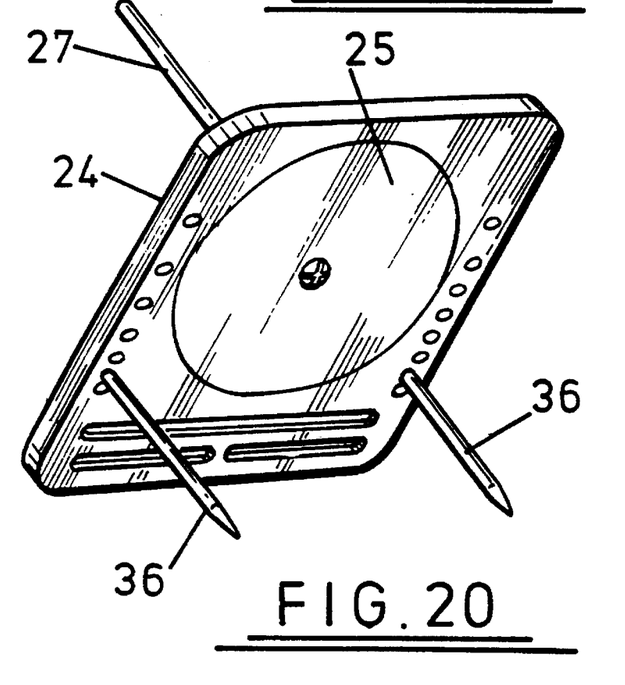
FIG. 20 illustrates the use of the embodiment of FIG. 13 as a sundial.

Referring now to FIGS. 19 and 20, FIG. 19 is a rear view of the assembled device illustrated in FIGS. 13 to 18. It will be seen that the underside of the base defines two arrays of apertures 33, a slot 34 in which the pin gnomon 27 can be stored, and slots 35 in which support pins 36 can be stored. As shown in FIG. 20, the pins 36 can be engaged in any selected pair of the holes 33 so as to determine the angle of inclination of the base 24 to any horizontal supporting surface. Thus the device can be used as a sundial with the inclination of the base 24 being selected to correspond to the latitude at which the device is being used. For example, the uppermost holes 33 in FIG. 19 could correspond to a latitude of 60°, the lowermost holes could correspond to a latitude of 25°, with the intermediate holes being spaced as appropriate for a change in latitude of 5°between each adjacent pair.

As a modification of the various embodiments of the indicator device described above, the base may be enlarged to provide a surface around the bearing indicator 2 upon which may be recorded the compass directions of locations of interest to the user, eg local landmarks. These may be permanently recorded directly on the base or indicated by way of stickers removably fixed to the base. The base 1 could itself be constructed to the required dimensions or alternatively a suitably dimensioned base "extension" could be provided which has a rectangular aperture so as to be a resilient fit around the base 1.

I claim:

1. A direction indicator comprising:
    a base for placement in a predetermined orientation on a horizontal surface;
    said base defining four edges that extend parallel to the horizontal surface on which the base is placed and form portions of respective sides of a rectangle;
    a bearing indicator which is selectively positionable on the base, said bearing indicator carrying compass bearing information; and,
    a gnomon supported in a predetermined position relative to the bearing indicator, whereby for a given orientation of the base the bearing indicator is appropriately positioned relative to the base by reference to the direction of a shadow cast by the gnomon at a predetermined time of day and by reference to the bearing of the sun at that predetermined time of day.

2. A direction indicator according to claim 1, wherein the bearing indicator is a circular disc rotatably mounted horizontally on the base.

3. A direction indicator according to claim 1, wherein the bearing indicator is a flat ring rotatably mounted horizontally on the base.

4. A direction indicator according to claim 3, wherein the bearing indicator is a snap fit within a formation defined by the base.

5. A direction indicator according to claim 4, wherein at least one edge of the base is shaped to engage a mating formation on the bearing indicator, at least one of the base and bearing indicator being constructed from a resilient material.

6. A direction indicator according to claim 1, wherein said gnomon is in the form of a fin disposed on a diameter of the bearing indicator.

7. A direction indicator according to claim 6, wherein said gnomon is rotatable both with respect to the base and the bearing indicator.

8. A direction indicator according to claim 1, wherein said gnomon is a pin which mounts in a hole so that it extends vertically.

9. A direction indicator according to claim 1, wherein the bearing indicator carries time information in addition to compass bearing information so that it can function as a dual direction indicator/sundial.

10. A direction indicator according to claim 9, comprising means for supporting the indicator in at least one orientation inclined to a horizontal suporting surface when the indicator is functioning as a sundial.

* * * * *